(12) United States Patent
Peck

(10) Patent No.: US 11,535,057 B2
(45) Date of Patent: Dec. 27, 2022

(54) AXLE ASSEMBLY WITH SEALED WHEEL END BEARINGS AND SEALED PINION INPUT BEARINGS

(71) Applicant: Mahindra N.A. Tech Center, Auburn Hills, MI (US)

(72) Inventor: David E. Peck, Rochester Hills, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 114 days.

(21) Appl. No.: 17/015,543

(22) Filed: Sep. 9, 2020

(65) Prior Publication Data

US 2022/0072902 A1 Mar. 10, 2022

(51) Int. Cl.
*B60B 35/18* (2006.01)
*B60B 35/12* (2006.01)
(Continued)

(52) U.S. Cl.
CPC ........ *B60B 35/125* (2013.01); *B60B 27/0015* (2013.01); *B60B 35/14* (2013.01);
(Continued)

(58) Field of Classification Search
CPC ... B60B 35/125; B60B 27/0015; B60B 35/14; B60B 35/16; B60B 35/18; B60B 37/10;
(Continued)

(56) References Cited

U.S. PATENT DOCUMENTS 2,204,287 A 6/1940 Wilber
2,478,180 A 8/1949 Buckendale
(Continued)

FOREIGN PATENT DOCUMENTS

DE 20221813 U1 2/2008
JP 10009258 A 1/1998
(Continued)

OTHER PUBLICATIONS

U.S. Appl. No. 17/015,272, filed Sep. 9, 2020, David Peck.
(Continued)

*Primary Examiner* — Justin Holmes
(74) *Attorney, Agent, or Firm* — Harness, Dickey & Pierce, P.L.C.

(57) ABSTRACT

A vehicle axle assembly including an axle housing, carrier assembly, and first and second axle shafts. The axle housing is formed from an upper beam and a lower beam that are positioned in a clam-shell arrangement. The carrier assembly includes a carrier housing and a differential that includes a ring gear arranged in meshing engagement with a pinion. The first and second axle shafts extend outwardly from the differential in opposite directions. The pinion is rotatably supported by a self-lubricating cartridge pinion input bearing and the outboard ends of the first and second axle shafts are rotatably supported by self-lubricating and unitized grease wheel end bearings. These bearings do not require lubrication from oil contained inside the axle housing allowing for a reduced oil fill level in the axle housing, creating less viscous losses and better efficiency.

4 Claims, 5 Drawing Sheets

(51) Int. Cl.
| | |
|---|---|
| *B60B 27/00* | (2006.01) |
| *B60B 35/14* | (2006.01) |
| *B60B 35/16* | (2006.01) |
| *F16H 48/08* | (2006.01) |
| *F16H 57/037* | (2012.01) |
| *B60B 37/10* | (2006.01) |
| *F16H 57/04* | (2010.01) |
| *F16C 33/66* | (2006.01) |
| *B60R 17/00* | (2006.01) |
| *F16H 57/02* | (2012.01) |

(52) U.S. Cl.
CPC .............. *B60B 35/16* (2013.01); *B60B 35/18* (2013.01); *B60B 37/10* (2013.01); *B60R 17/00* (2013.01); *F16C 33/6607* (2013.01); *F16H 48/08* (2013.01); *F16H 57/037* (2013.01); *F16H 57/0457* (2013.01); *F16H 57/0483* (2013.01); *B60B 27/0026* (2013.01); *B60B 27/0052* (2013.01); *B60B 2900/111* (2013.01); *B60B 2900/561* (2013.01); *F16C 2361/61* (2013.01); *F16H 2057/02052* (2013.01)

(58) Field of Classification Search
CPC ............ B60B 27/0026; B60B 27/0052; B60B 2900/111; B60B 2900/561; B60R 17/00; F16H 48/08; F16H 57/037; F16H 57/0457; F16H 57/0483; F16H 2057/02052; F16C 2361/61; F16C 33/6607
See application file for complete search history.

(56) References Cited

U.S. PATENT DOCUMENTS

| | | | |
|---|---|---|---|
| 2,674,783 | A | 4/1954 | Schneider et al. |
| 2,961,888 | A | 11/1960 | Wildhaber |
| 3,706,350 | A | 12/1972 | Bokovoy |
| 3,838,751 | A | 10/1974 | Brown |
| 4,921,036 | A | 5/1990 | Kuwahara |
| 5,267,489 | A | 12/1993 | Ziech |
| 5,271,294 | A * | 12/1993 | Osenbaugh ............ B60K 17/16 74/606 R |
| 5,411,699 | A | 5/1995 | Collette et al. |
| 5,492,419 | A | 2/1996 | Miller et al. |
| 5,634,374 | A | 6/1997 | Depietri |
| 5,775,975 | A | 7/1998 | Mizuno et al. |
| 5,840,350 | A | 11/1998 | Salemi |
| 5,884,980 | A * | 3/1999 | Visser ................ B60B 27/0068 188/218 XL |
| 6,093,127 | A | 7/2000 | DiDomenico et al. |
| 6,349,781 | B1 | 2/2002 | Kruse |
| 6,364,803 | B1 | 4/2002 | Barnholt et al. |
| 6,514,169 | B2 | 2/2003 | Turner et al. |
| 6,561,788 | B1 | 5/2003 | Gaudoin |
| 6,609,649 | B1 * | 8/2003 | Barnholt ............ B23K 31/022 228/171 |
| 6,623,867 | B2 | 9/2003 | Crocco et al. |
| 6,729,206 | B2 | 5/2004 | Hayabuchi et al. |
| 6,863,634 | B2 | 3/2005 | Holman et al. |
| 6,896,270 | B1 * | 5/2005 | Sturman ................ F16C 33/60 277/572 |
| 6,948,924 | B2 | 9/2005 | Tsau et al. |
| 6,979,131 | B1 | 12/2005 | Lippert et al. |
| 7,004,277 | B2 | 2/2006 | Pollock et al. |
| 7,137,183 | B2 | 11/2006 | Stuart et al. |
| 7,210,374 | B2 | 5/2007 | Leimann |
| 7,231,847 | B2 | 6/2007 | Hibbler et al. |
| 7,258,644 | B2 | 8/2007 | Ziech et al. |
| 7,287,911 | B2 | 10/2007 | Dodoro et al. |
| 7,306,536 | B2 | 12/2007 | Ziech |
| 7,377,598 | B2 | 5/2008 | Doud et al. |
| 7,503,240 | B2 | 3/2009 | Hibbler et al. |
| 7,537,390 | B2 | 5/2009 | De Boer et al. |
| 7,585,032 | B2 | 9/2009 | Seeds et al. |
| 7,658,128 | B2 | 2/2010 | Sugano |
| 7,984,552 | B2 | 7/2011 | Doud et al. |
| 8,166,848 | B2 | 5/2012 | Uozumi et al. |
| 8,176,811 | B2 | 5/2012 | Peterson et al. |
| 8,186,884 | B2 | 5/2012 | Henneberger |
| 8,464,611 | B1 | 6/2013 | Chandler |
| 8,469,462 | B2 | 6/2013 | Doud et al. |
| 8,573,087 | B2 | 11/2013 | Stadtfeld |
| 8,591,116 | B2 | 11/2013 | Fedorovich |
| 8,776,374 | B2 | 7/2014 | Johnston et al. |
| 8,881,401 | B2 | 11/2014 | Aoyama et al. |
| 8,911,312 | B2 | 12/2014 | Itoo et al. |
| 8,951,034 | B2 | 2/2015 | Christiansen et al. |
| 9,022,893 | B2 | 5/2015 | Hirao et al. |
| 9,151,329 | B2 | 10/2015 | Katsaros |
| 9,221,219 | B2 | 12/2015 | Frederiksen |
| 9,517,658 | B2 | 12/2016 | Chung et al. |
| 9,669,710 | B2 | 6/2017 | Meixner |
| 9,746,069 | B2 | 8/2017 | Gerstenberger et al. |
| 9,810,309 | B2 | 11/2017 | Chen et al. |
| 9,884,359 | B2 | 2/2018 | Peters et al. |
| 10,179,478 | B2 | 1/2019 | Bauer et al. |
| 10,352,431 | B2 | 7/2019 | Nakagawa et al. |
| 2003/0070501 | A1 | 4/2003 | Bell |
| 2005/0238273 | A1 | 10/2005 | Kawamura et al. |
| 2012/0021863 | A1 | 1/2012 | Hirao et al. |
| 2015/0020626 | A1 | 1/2015 | Aoyama et al. |
| 2015/0087461 | A1 | 3/2015 | Jackson et al. |
| 2015/0211604 | A1 | 7/2015 | Hirao et al. |
| 2018/0259038 | A1 | 9/2018 | Aoyama et al. |
| 2019/0024772 | A1 | 1/2019 | Ketchel et al. |
| 2019/0293168 | A1 | 9/2019 | Abe et al. |

FOREIGN PATENT DOCUMENTS

| | | |
|---|---|---|
| JP | H 109259 A | 1/1998 |
| KR | 20140069451 A | 6/2014 |
| KR | 10-1982224 B1 | 5/2019 |
| WO | WO-9626844 A1 * | 9/1996 ............ B60B 35/18 |
| WO | WO-2017/216404 A1 | 12/2017 |

OTHER PUBLICATIONS

U.S. Appl. No. 17/015,294, filed Sep. 9, 2020, David Peck.
U.S. Appl. No. 17/015,430, filed Sep. 9, 2020, David Peck.
U.S. Appl. No. 17/015,472, filed Sep. 9, 2020, David Peck.

* cited by examiner

AXLE ASSEMBLY WITH SEALED WHEEL END BEARINGS AND SEALED PINION INPUT BEARINGS

FIELD

The subject disclosure is generally directed to axle assemblies for vehicles, such as solid front or rear axle assemblies used in automobiles and trucks.

BACKGROUND

This section provides background information related to the present disclosure which is not necessarily prior art.

Axle assemblies are commonly used to support and/or rotationally drive the wheels of a vehicle. For example, a vehicle may include a front axle assembly to which front wheels of the vehicle are mounted and a rear axle assembly to which rear wheels of the vehicle are mounted. Typically, the front and rear axle assemblies extend across the vehicle in a transverse direction that is perpendicular to the direction of vehicle travel. The front and rear axle assemblies support the front and rear wheels and are connected to a body and/or frame of the vehicle by front and rear suspension systems that articulate to allow the front and rear axle assemblies to move up and down relative to the body and/or frame of the vehicle.

One or more axle assemblies of the vehicle may also transfer rotational power and torque provided by an engine of the vehicle to the wheels. For example, the engine may rotationally drive a drive shaft through a transmission assembly. The axle assembly may include a pinion gear that is rotationally driven by the drive shaft and a differential that transfers rotational power and torque from the pinion gear to a pair of axle shafts that extend out from the differential in opposite transverse directions. These axle shafts are connected to and drive the wheels on opposing ends of the axle assembly. A pinion input bearing mounted to a carrier is typically used to support the pinion gear and wheel end bearings mounted to opposing ends of an axle housing are typically used to support the pinion gear and the axle shafts, respectively. Typically, these bearings must be lubricated by oil contained within the axle housing.

Axle assemblies are part of the unsprung mass/weight of the vehicle because they move with the wheels instead of with the vehicle body. In many applications, a reduction in the unsprung mass of the vehicle affords improved handling, performance, and ride control because there is less unsprung inertia that the vehicle's suspension system has to control during cornering, braking, acceleration, and impacts caused when the vehicle travels over an uneven surface (i.e., bumps). As a result, there is a need for axle assemblies that have reduced weight. In addition, axle assemblies contribute to friction and viscous losses in a vehicle's drivetrain due to the differential and gears. There is therefore an additional need for more efficient axle assemblies. Improvements in these areas can improve the overall fuel economy of the vehicle, which is a high priority amongst vehicle manufactures.

SUMMARY

This section provides a general summary of the disclosure, and is not a comprehensive disclosure of its full scope or all of its features.

In accordance with one aspect of the present disclosure, an improved axle assembly for a vehicle is provided. The axle assembly includes an axle housing, a carrier assembly, and first and second axle shafts. The axle housing extends longitudinally along a longitudinal axis between a first wheel end and a second wheel end. The axle housing includes a center section, a first tubular segment extending longitudinally between the first wheel end and the center section, and a second tubular segment extending longitudinally between the second wheel end and the center section. The carrier assembly is housed in the center section of the axle housing. The carrier assembly includes a carrier housing, a pinion, and a differential. The carrier housing is fixedly mounted to the axle housing. The pinion includes a pinion gear and a pinion shaft. The pinion shaft extends through the carrier housing. The differential is rotatably supported by the carrier housing. In other words, the differential can rotate relative to the carrier housing about the longitudinal axis. The differential includes a gear set. The gear set includes a ring gear that is arranged in meshing engagement with the pinion gear.

The first axle shaft extends longitudinally through the first tubular segment of the axle housing between a first axle shaft inboard end and a first axle shaft outboard end. The second axle shaft extends longitudinally through the second tubular segment of the axle housing between a second axle shaft inboard end and a second axle shaft outboard end. The first and second axle inboard ends extend into the differential from opposing sides and are rotationally coupled to the pinion gear through the gear set of the differential.

The axle assembly includes a self-lubricating bearing arrangement where the pinion shaft is rotatably supported by a self-lubricating cartridge pinion input bearing, the first axle shaft outboard end is rotatably supported by a first self-lubricating and unitized grease wheel end bearing, and the second axle shaft outboard end is rotatably supported by a second self-lubricating and unitized grease wheel end bearing. The self-lubricating cartridge pinion input bearing is mounted to the carrier housing, the first self-lubricating and unitized grease wheel end bearing is mounted to the first wheel end of the axle housing, and the second self-lubricating and unitized grease wheel end bearing is mounted to the second wheel end of the axle housing.

Unlike in conventional axle assemblies, these three bearings do not require lubrication from oil contained inside the axle housing. This means that oil does not have to flow into the first and second tubular segments of the axle housing to lubricate the wheel end bearings, nor does oil have to reach the pinion input bearing. Because oil in the axle housing is only required for lubrication of the ring gear, pinion gear, and differential, the lubrication volume of the oil can be contained entirely within the center section of the axle housing with an oil fill level that is below the first and second tubular segments. In other words, the self-lubricating bearing arrangement of the axle assembly allows for a reduced oil fill height in the axle housing, which in turn decreases viscous losses (e.g., churning losses) and reduces the wet-weight of the axle assembly for better efficiency (i.e., better fuel economy).

The self-lubricating bearing arrangement of the axle assembly can also provide improved durability. In traditional axle assemblies, oil can slosh around inside the axle housing to the point where the pinion input bearing or one of the wheel end bearings becomes starved of lubricating oil. By way of example and without limitation, this can occur during hard braking, acceleration, and cornering or when the vehicle encounters steep grades (e.g., grades up to 30 percent or more). During the aforementioned conditions, the pinion input bearing and wheel end bearings may not have enough oil delivered to them to be properly lubricated. When this happens, increased wear and damage can occur, which may lead to reduced bearing life or bearing failure. To address this problem, some axle assemblies include internal baffles to limit the sloshing of oil, but this solution adds weight, manufacturing complexity, and cost. The self-lubricating bearing arrangement of the axle assembly described herein eliminates the oil sloshing problem altogether.

In accordance with another aspect of the present disclosure, the axle assembly may include an upper beam and a lower beam that are positioned in a clam-shell arrangement and cooperate to form the center section and the first and second tubular segments of the axle housing. By forming the axle housing from upper and lower beams, weight savings can be achieved while the axle housing can be designed to flex to some degree and tuned to dampen certain bump frequencies.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
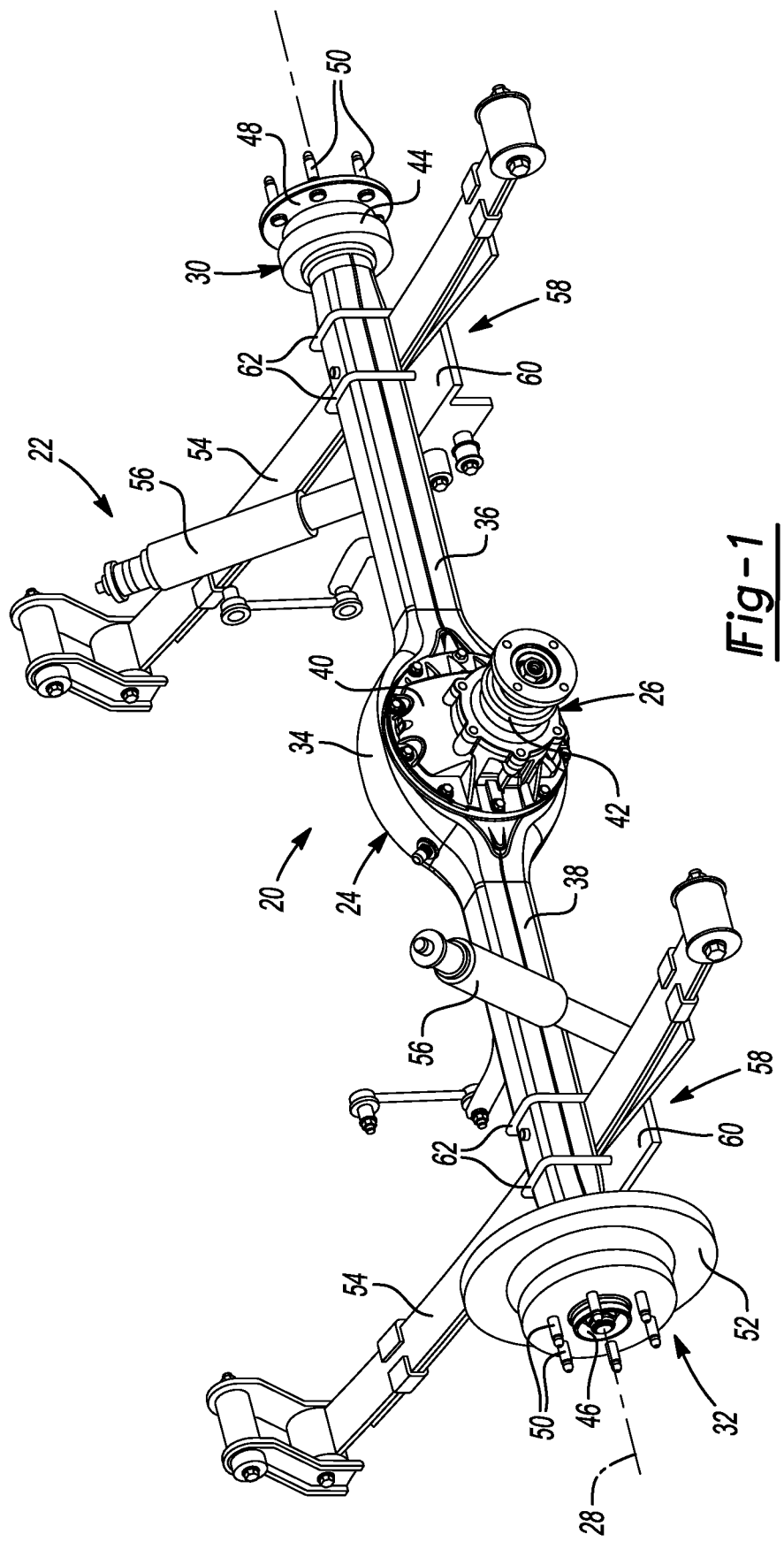
FIG. 1 is a front perspective view of an exemplary axle assembly that has been constructed in accordance with the present disclosure and that is shown in combination with an exemplary suspension system.
Figure 2:
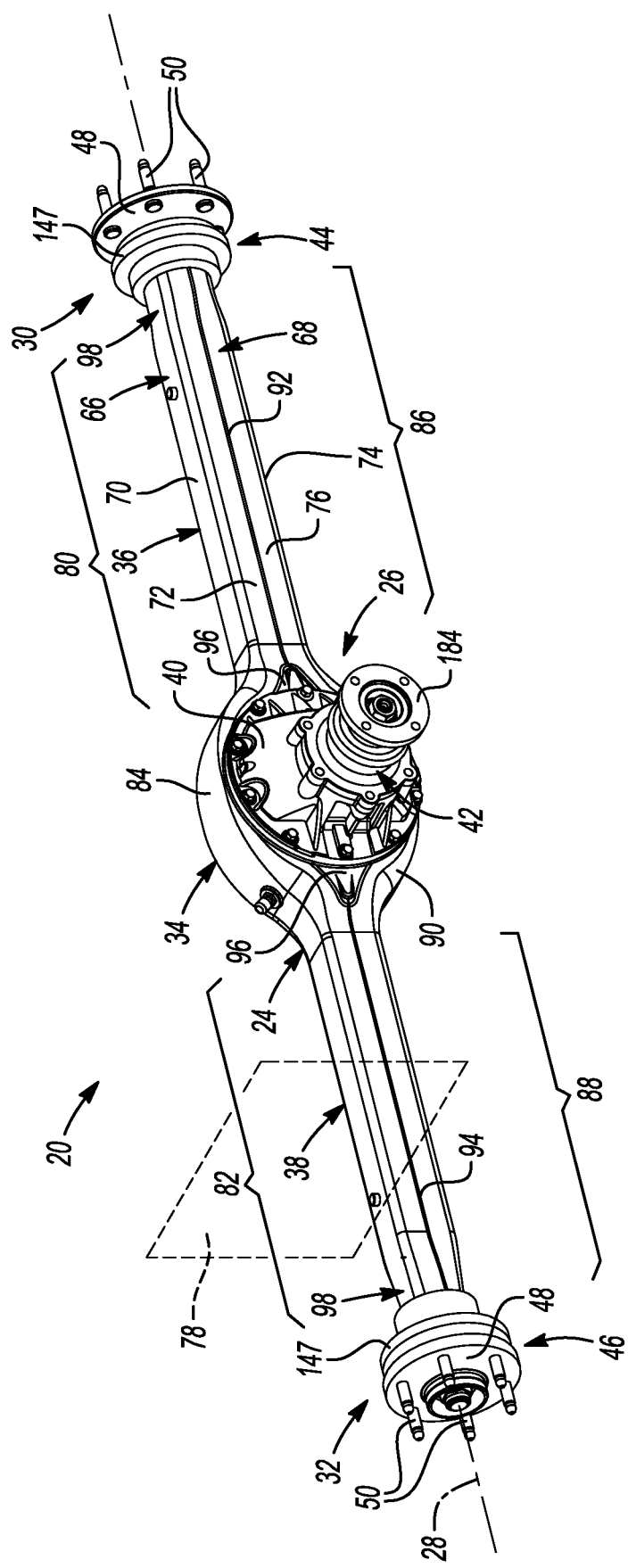
FIG. 2 is a front perspective view of the exemplary axle assembly shown in FIG. 1.
Figure 3:
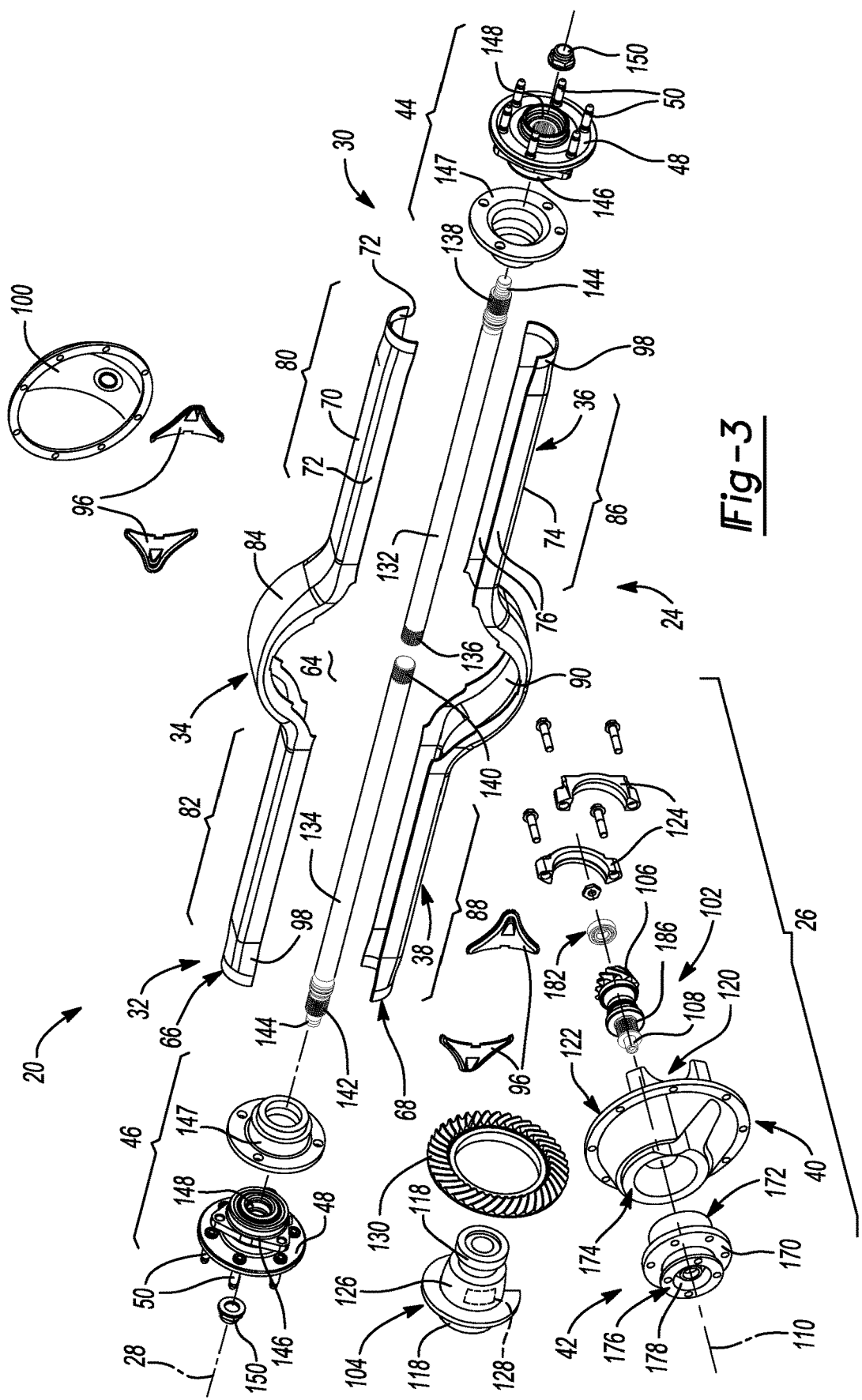
FIG. 3 is an exploded perspective view of the exemplary axle assembly shown in FIG. 1.

Referring to the Figures, wherein like numerals indicate corresponding parts throughout the several views, an axle assembly 20 for a vehicle is illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates the axle assembly 20 of the present disclosure connected to an exemplary suspension system 22. The axle assembly 20 includes an axle housing 24 and a carrier assembly 26. The axle housing 24 extends longitudinally along a longitudinal axis 28 between a first wheel end 30 and a second wheel end 32. The axle housing 24 includes a center section 34, a first tubular segment 36 that extends longitudinally between the first wheel end 30 and the center section 34, and a second tubular segment 38 that extends longitudinally between the second wheel end 32 and the center section 34. The carrier assembly 26 includes a carrier housing 40 and a self-lubricating cartridge pinion input bearing 42 that is mounted to the carrier housing 40. A first self-lubricating and unitized grease wheel end bearing 44 is mounted to the first wheel end 30 of the axle housing 24 and a second self-lubricating and unitized grease wheel end bearing 46 is mounted to the second wheel end 32 of the axle housing 24. Each of the first and second self-lubricating and unitized grease wheel end bearings 44, 46 include wheel flanges 48 that are provided with circumferentially spaced wheel studs 50. A brake rotor 52 may be mounted to the wheel flanges 48 with the wheel studs 50 extending through the brake rotor 52. It should therefore be appreciated that the wheels of a vehicle (not shown) may be secured to the wheel flanges 48 of the first and second self-lubricating and unitized grease wheel end bearings 44, 46 by the wheel studs 50.

The suspension system 22 supporting the axle assembly 20 includes a pair of leaf springs 54 and a pair of dampers 56. Both the leaf springs 54 and the dampers 56 are connected to the axle assembly 20 by a pair of shackles 58. The shackles 58 include shackle plates 60 that are clamped to the first and second tubular segments 36, 38 of the axle housing 24 by U-bolts 62. The free ends of the leaf springs 54 and dampers 56 shown in FIG. 1 are configured to bolt to a body or frame of the vehicle (not shown). It should be appreciated that the axle assembly 20 illustrated in FIG. 1 could serve as either a front axle or rear axle of the vehicle.

Referring now to FIGS. 2-5, the center section 34 of the axle housing 24 is hollow, as are the first and second tubular segments 36, 38. The center section 34 and the first and second tubular segments 36, 38 of the axle housing 24 therefore cooperate to define a combined inner volume 64 of the axle housing 24. The axle housing 24 includes an upper beam 66 and a lower beam 68 that are positioned in a clam-shell arrangement. As a result, the upper and lower beams 66, 68 cooperate to form the center section 34 and the first and second tubular segments 36, 38 of the axle housing 24. The upper beam 66 of the axle housing 24 includes an upper wall 70 and a pair of upper beam side walls 72 that extend down from the upper wall 70. The lower beam 68 of the axle housing 24 includes a lower wall 74 and a pair of lower beam side walls 76 that extend up from the lower wall 74. Consequently, the upper and lower beams 66, 68 having opposing U-shaped cross-sections when viewed from the side (i.e., the cross-sections of the upper and lower beams 66, 68 are U-shaped when the cross-sections are taken along a transverse plane 78 that is perpendicular to the longitudinal axis 28).

The upper beam 66 of the axle housing 24 includes a first longitudinal section 80, a second longitudinal section 82, and an upwardly curved section 84 positioned longitudinally between the first and second longitudinal sections 80, 82. The lower beam 68 of the axle housing 24 including a third longitudinal section 86, a fourth longitudinal section 88, and a downwardly curved section 90 that is positioned longitudinally between the third and fourth longitudinal sections 86, 88. The first longitudinal section 80 of the upper beam 66 cooperates with the third longitudinal section 86 of the lower beam 68 to form the first tubular segment 36 of the axle housing 24. The second longitudinal section 82 of the upper beam 66 cooperates with the fourth longitudinal section 88 of the lower beam 68 to form the second tubular segment 38 of the axle housing 24. The upwardly curved section 84 of the upper beam 66 and the downwardly curved section 90 of the lower beam 68 thus form the center section 34 of the axle housing 24. Although other configurations are possible, the upper and lower beams 66, 68 may be made of metal, such as iron, steel, or aluminum, and the upper beam side walls 72 may be welded to the lower beam side walls 76 at first and second seams 92, 94, which are disposed on opposing sides of the center section 34. Truss plates 96 may also be welded to the upper and lower beam side walls 70, 76 near the center section 34 for added strength and/or ease of manufacturing. Optionally, the first and second tubular segments 36, 38 of the axle housing 24 have an inward taper 98 at the first and second wheel ends 30, 32 to accommodate the first and second self-lubricating and unitized grease wheel end bearings 44, 46.

The carrier assembly 26 is housed in the center section 34 of the axle housing 24 and the carrier housing 40 is fixedly mounted to the center section 34 of the axle housing 24. A differential cover plate 100 is also fixedly mounted to the center section 34 of the axle housing 24, opposite the carrier housing 40. Although other configurations are possible, both the carrier housing 40 and the differential cover plate 100 may be made of metal, such as iron, steel, or aluminum, and may be bolted or welded to the axle housing 24. The carrier assembly 26 also includes a pinion 102 and a differential 104.

The pinion 102 includes a pinion gear 106 and a pinion shaft 108 that extends through the carrier housing 40 along a pinion shaft axis 110. The pinion shaft axis 110 extends perpendicularly relative to the longitudinal axis 28 of the axle housing 24 and is spaced from the longitudinal axis 28 by a hypoid offset distance 112 (see FIG. 5). By way of example only and without limitation, the hypoid offset distance 112 may be small, such as 5 to 20 millimeters (mm) and preferably 10 millimeters (mm). This small hypoid offset reduces friction (e.g., scuffing losses) in the pinion gear mesh by approximately 3 percent compared to larger hypoid offset distances in the 35-45 millimeter (mm) range. The pinion shaft 108 may be configured to include an inboard pinion shaft segment 114 and an outboard pinion shaft segment 116. The pinion gear 106 is positioned axially between the inboard pinion shaft segment 114 and the outboard pinion shaft segment 116 such that the inboard pinion shaft segment 114 protrudes inwardly from the pinion gear 106 and the outboard pinion shaft segment 116 protrudes outwardly from the pinion gear 106 along the pinion shaft axis 110.

The differential 104 is rotatably supported on the carrier housing 40 by a pair of differential bearings 118. As a result, the differential 104 is rotatable relative to the carrier housing 40 about the longitudinal axis 28. The differential bearings 118 are held between a pair of mounting bosses 120 that extend from an inboard side 122 of the carrier housing 40 and a pair of clamps 124 that extend partially about the differential bearings 118. Although other configurations are possible, the clamps 124 may be bolted to the mounting bosses 120 of the carrier housing 40. The differential 104 includes a differential body 126 and a planetary gear set 128. The planetary gear set 128 includes a ring gear 130 that is arranged in meshing engagement with the pinion gear 106. The ring gear 130 is fixed to the differential body 126 and therefore rotates co-axially about the longitudinal axis 28 of the axle housing 24. By way of example and without limitation, the ring gear 130 may be fixed to the differential body 126 by laser welding instead of by a flanged and bolted connection, which can help reduce weight, eliminate fastener costs, eliminated bolts as a potential failure mode, and reduce churning losses. It should be appreciated that the differential 104 may be any one of the various types of differentials known in the industry, including without limitation, open differentials, limited slip differentials, electronic differentials, and locking differentials.

The axle assembly 20 also includes first and second axle shafts 132, 134 that extend out along the longitudinal axis 28 from opposing sides of the differential 104. The first axle shaft 132 extends longitudinally through the first tubular segment 36 of the axle housing 24 between a first axle shaft inboard end 136 and a first axle shaft outboard end 138. The second axle shaft 134 extends longitudinally through the second tubular segment 38 of the axle housing 24 between a second axle shaft inboard end 140 and a second axle shaft outboard end 142. The first and second axle shaft inboard ends 136, 140 and the first and second axle shaft outboard ends 138, 142 are splined. The first and second axle shaft outboard ends 138, 142 may also include threaded portions 144. The first and second axle inboard ends 136, 140 are received in the differential 104 and are rotationally coupled to the pinion gear 106 through the planetary gear set 128.

The axle assembly 20 of the present disclosure uniquely includes a self-lubricating bearing arrangement that includes the combination of a self-lubricating cartridge pinion input bearing 42 with first and second self-lubricating and unitized grease wheel end bearings 44, 46. In accordance with this arrangement, the outboard pinion shaft segment 116 is rotatably supported by the self-lubricating cartridge pinion input bearing 42, which is mounted to the carrier housing 40 and allows the pinion 102 to rotate relative to the carrier housing 40 about the pinion shaft axis 110. The first axle shaft outboard end 138 is rotatably supported by the first self-lubricating and unitized grease wheel end bearing 44, which is mounted to the first wheel end 30 of the axle housing 24. The second axle shaft outboard end 142 is rotatably supported by a second self-lubricating and unitized grease wheel end bearing 46, which is mounted to the second wheel end 32 of the axle housing 24. As a result, the first and second axle shafts 132, 134 can rotate within the axle housing 24 about the longitudinal axis 28.

As explained above, wheel flanges 48 of the first and second self-lubricating and unitized grease wheel end bearings 44, 46 have circumferentially spaced wheel studs 50. These wheel flanges 48 are connected to and rotate with an inner race 146 of the first and second self-lubricating and unitized grease wheel end bearings 44, 46. The inner races 146 include splined bores 148 that receive the first and second axle shaft outboard ends 138, 142 such that the splines on these respective components rotatably couple the inner races 146 and thus the wheel flanges 48 to the first and second axle shafts 132, 134. Because the splines on the first and second axle shaft inboard ends 136, 140 mate with the differential 104, which is rotatably driven by the ring gear/pinion gear mesh, the rotational power and torque of the engine can be transmitted to the wheels of the vehicle. The first and second self-lubricating and unitized grease wheel end bearings 44, 46, also include outer races 147 that extend annularly about the inner races 146. The outer races 147 are fixedly mounted to the first and second wheel ends 30, 32 of the axle housing 24, such as by welding or a bolted connection. Greased bearings (not shown) may be provided between the inner and outer races 146, 147 to reduce friction. These greased bearings could be tapered roller bearings, high contact ball bearings, or a combination of tapered roller bearings and high contact ball bearings depending on the desired load rating. Wheel end nuts 150 thread onto the threaded portions 144 of the first and second axle shaft outboard ends 138, 142 to prevent free play along the longitudinal axis 28 between the wheel flanges 48 and the first and second axle shafts 132, 134.

In accordance with this design, the first and second axle shafts 132, 134 are provided in a full floating arrangement, where both the first and second axle shaft inboard ends 136, 140 and both the first and second axle shaft outboard ends 138, 142 have splined connections and are supported by bearings 44, 46, 118. This full floating arrangement provides better support for the first and second axle shafts 132, 134, which reduces binding and distributes loading between multiple bearings 44, 46, 118 for improvements in mechanical efficiency and durability.

Figure 5:
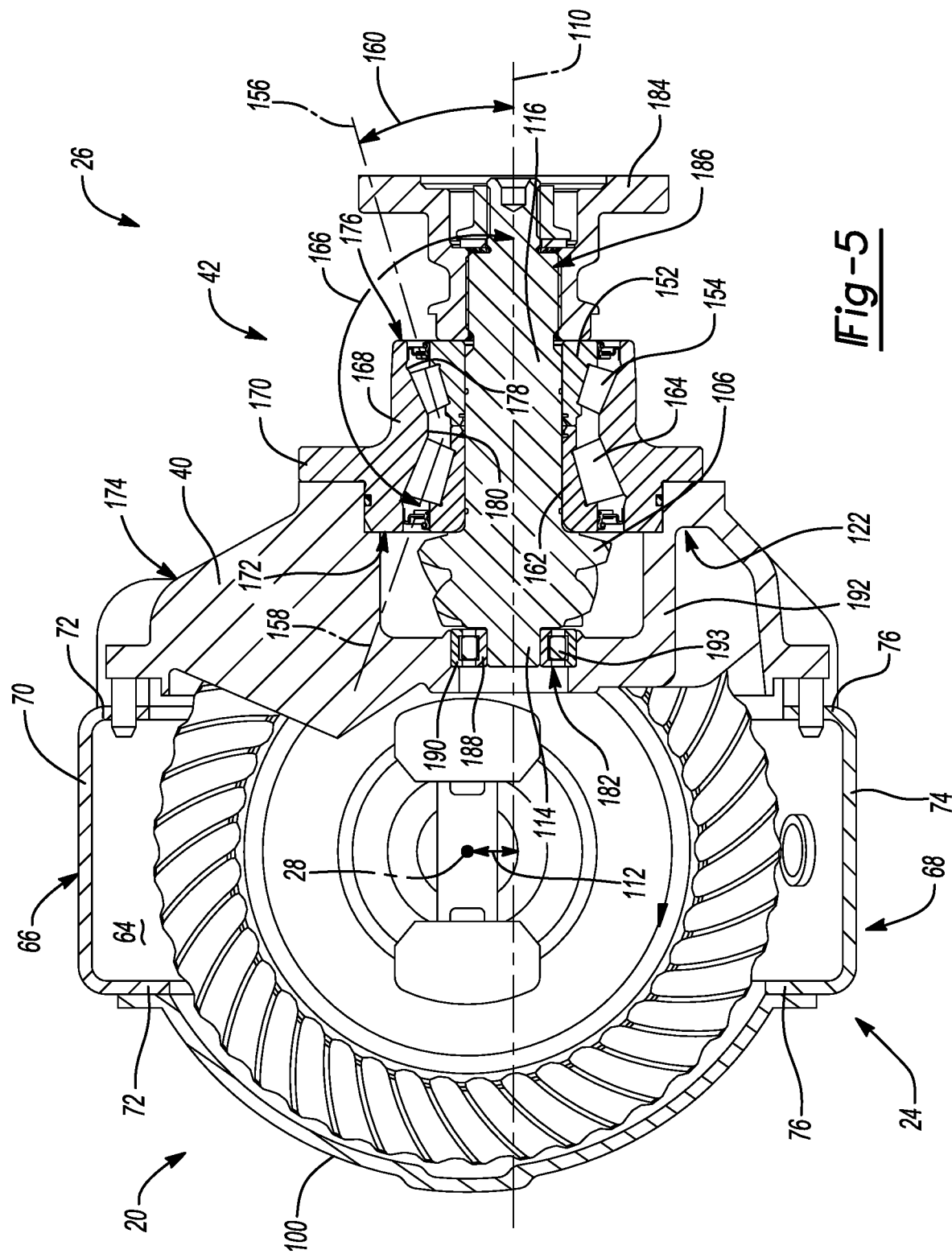
FIG. 5 is a side section view of the exemplary axle assembly.

As best seen in FIG. 5, the self-lubricating cartridge pinion input bearing 42 includes a first cone 152 that extends annularly about the outboard pinion shaft segment 116. The first cone 152 supports a first set of cylindrical roller bearings 154 at a number of circumferentially spaced positions. Each cylindrical roller bearing 154 in the first set of cylindrical roller bearings 154 rotates about its own roller bearing axis 156 that is arranged at a first angle 160 relative to the pinion shaft axis 110 and can rotate relative to the first cone 152 and the pinion shaft 108. The first angle 160 is an acute angle (i.e., greater than zero degrees, but less than 90 degrees relative to the pinion shaft axis 110) with an arc that opens away from the pinion gear 106. The self-lubricating cartridge pinion input bearing 42 also includes a second cone 162 that extends annularly about the outboard pinion shaft segment 116 at a location that is positioned axially between the first cone 152 and the pinion gear 106. The second cone 162 supports a second set of cylindrical roller bearings 164 at a number of circumferentially spaced positions. Each cylindrical roller bearing 164 in the second set of cylindrical roller bearings 164 rotates about its own roller bearing axis 158 that is arranged at a second angle 166 relative to the pinion shaft axis 110 and can rotate relative to the second cone 162 and the pinion shaft 108. The second angle 166 is an obtuse angle (i.e., greater than 90 degrees, but less than 180 degrees relative to the pinion shaft axis 110) with an arc that opens away from the pinion gear 106. In the illustrated embodiment, the first and second angles 160, 166 are supplementary angles, meaning that the sum of the first and second angles 160, 166 equals 180 degrees. It should be appreciated that each of the first and second angles 160,166 has an apex intersecting the pinion shaft axis 100 so that the apex of the rollers 154, 164 coincides with the pinion's rotating centerline to reduce skidding of the rollers. Skidding results for roller, tapered roller & ball bearings due to a circumference difference of the inner & outer bearing races.

The self-lubricating cartridge pinion input bearing 42 includes and a one-piece cup 168 that extends annularly about the cylindrical roller bearings 154, 164. The one-piece cup 168 includes a cup flange 170 that is fixedly coupled to the carrier housing 40, such as through a bolted connection. The one-piece cup 168 extends axially between an inboard edge 172 that abuts an outside face 174 of the carrier housing 40 and an outboard edge 176 opposite the inboard edge 172 that faces away from the carrier housing 40. The one-piece cup 168 also includes a tapered bore 178 that increases in diameter moving in opposing directions from an intermediate portion 180 of the one-piece cup 168 to the inboard and outboard edges 172, 176. In this way, the tapered bore 178 matches the mounting orientation of the cylindrical bearings 154, 164, where the first and second angles 160, 166 that the cylindrical bearings 154, 164 are supported at slope inwardly towards the intermediate portion 180 of the one-piece cup 168. Alternatively, the cylindrical roller bearings 154, 164 could be replaced by tapered roller bearings, high contact ball bearings, or a combination of tapered roller bearings and high contact ball bearings depending on the desired load rating. It should also be appreciated that self-lubricating cartridge pinion input bearing 42 could be configured as a sealed grease bearing or a sealed oil bath bearing. In configurations where the self-lubricating cartridge pinion input bearing 42 is a sealed oil bath bearing, it could be provided with a remote sump, forced lubrication, and passive or active cooling. As such, the self-lubricating cartridge pinion input bearing 42 could be lubricated with grease, gear lube, or ATF (automatic transmission fluid).

A coupler 184 may be rotationally coupled to the outboard pinion shaft segment 116 by a splined connection 186 and the coupler 184 may be bolted or otherwise connected to a drive shaft (not shown) that is rotationally driven by a motor (not shown), through a transmission (not shown). The inboard pinion shaft segment 114 is rotatably supported by a spigot bearing 182. The spigot bearing 182 includes an inside race 188 that extends annularly about the inboard pinion shaft segment 114, an outside race 190 that is supported by a spigot support boss 192 that protrudes axially from the inside face of the carrier housing 40 and extends annularly about the outside race 190 of the spigot bearing 182. A plurality of ball bearings 193 are positioned radially between the inside and outside races 188, 190 of the spigot bearing 182. As a result, the pinion shaft 108 can rotate relative to the carrier housing 40 about the pinion shaft axis 110. The spigot bearing 182 helps support gear separation forces resulting from the pinion gear/ring gear mesh and therefore reduces the amount of deflection experienced by the pinion shaft 108. This allows the first and second cones 152, 162 to be placed closer to each other resulting in a more compact size for the self-lubricating cartridge pinion input bearing 42, resulting in less weight. For example, the first and second cones 152, 162 can be placed next to each other in an abutting arrangement.

Figure 4:
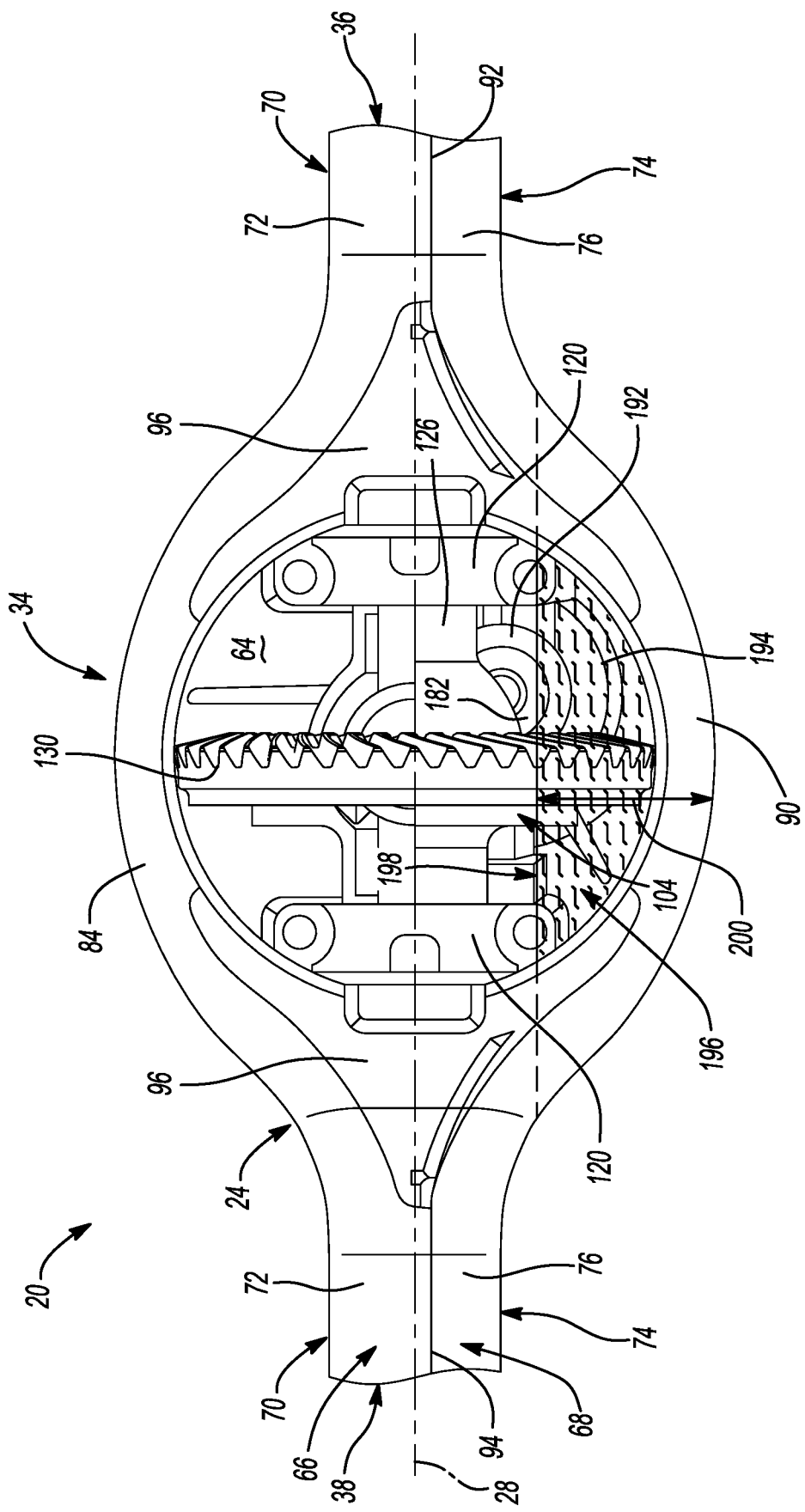
FIG. 4 is a rear elevation view looking in through a center section of the exemplary axle assembly shown in FIG. 1.

As shown in FIG. 4, a lubricating oil 194 occupies a lubrication volume 196 within the combined inner volume 64 of the axle housing 24. In accordance with the axle assembly 20 described herein, the lubricating oil 194 only has to lubricate the differential 104, the spigot bearing 182, the ring gear 130, and the pinion gear 106. The self-lubricating cartridge pinion input bearing 42 and the first and second self-lubricating and unitized grease wheel end bearings 44, 46 do not require lubrication from the lubricating oil 194 contained inside the axle housing 24. This means that the lubricating oil 194 does not have to flow into the first and second tubular segments 36, 38 of the axle housing 24 to lubricate the first and second self-lubricating and unitized grease wheel end bearings 44, 46, nor does lubricating oil 194 have to reach the self-lubricating cartridge pinion input bearing 42. As a result, the lubrication volume 196 of the lubricating oil 194 can be contained entirely within the center section 34 of the axle housing 24, where the rotating ring gear 130 will pick up and circulate/direct the lubricating oil 194 to the differential 104, spigot bearing 182, and pinion gear 106. This allows an oil fill level 198 that is below the lower wall 74 of the lower beam 68 in the first and second tubular segments 36, 38. In other words, the self-lubricating bearing arrangement of the axle assembly 20 described herein allows for a reduced oil fill height 200 in the axle housing 24, which in turn decreases viscous losses (e.g., churning losses) and reduces the wet-weight of the axle assembly 20 for better efficiency (i.e., better fuel economy).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. An axle assembly for a vehicle, including;
an axle housing extending longitudinally along a longitudinal axis between a first wheel end and a second wheel end;
said axle housing including a center section, a first tubular segment extending longitudinally between said first wheel end and said center section, and a second tubular segment extending longitudinally between said second wheel end and said center section;
said center section and said first and second tubular segments of said axle housing cooperate to define a combined inner volume of said axle housing;
a carrier assembly housed in said center section of said axle housing;
said carrier assembly including a carrier housing that is fixedly mounted to said axle housing, a pinion that includes a pinion gear and a pinion shaft that extends through said carrier housing, and a differential that is rotatably supported by said carrier housing;
said differential including a gear set having a ring gear that is arranged in meshing engagement with said pinion gear;
a first axle shaft extending longitudinally through said first tubular segment of said axle housing between a first axle shaft inboard end and a first axle shaft outboard end;
a second axle shaft extending longitudinally through said second tubular segment of said axle housing between a second axle shaft inboard end and a second axle shaft outboard end;
said first and second axle inboard ends extending into said differential from opposing sides and being rotationally coupled to said pinion gear through splined connections with said gear set;
a self-lubricating bearing arrangement wherein said pinion shaft is rotatably supported by a self-lubricating cartridge pinion input bearing that is mounted to said carrier housing, said first axle shaft outboard end is rotatably supported by a first self-lubricating and unitized grease wheel end bearing that is mounted to said first wheel end of said axle housing, said first axle shaft outboard end including a spline driving coupled to a wheel flange of the first self-lubricating and unitized grease wheel end bearing and said second axle shaft outboard end is rotatably supported by a second self-lubricating and unitized grease wheel end bearing that is mounted to said second wheel end of said axle housing, said second axle shaft outboard end including a spline driving coupled to a wheel flange of the second self-lubricating and unitized grease wheel end bearing; and
a lubricating oil occupying a lubrication volume within said combined inner volume of said axle housing for lubricating said differential, said ring gear, and said pinion gear, wherein said lubrication volume of lubricating oil is contained within said center section of said axle housing and defines an oil fill level in said center section that is positioned below said first and second tubular segments of said axle housing, said first and second axle shafts being mounted in a full floating arrangement outside of the lubrication volume.

2. An axle assembly as set forth in claim 1, wherein said pinion shaft includes an inboard pinion shaft segment and an outboard pinion shaft segment that both extend along a pinion shaft axis that extends perpendicularly relative to said longitudinal axis and that is spaced from said longitudinal axis by a hypoid offset distance.

3. An axle assembly as set forth in claim 2, wherein said pinion gear is positioned axially between said inboard pinion shaft segment and said outboard pinion shaft segment such that said inboard pinion shaft segment protrudes inwardly from said pinion gear and said outboard pinion shaft segment protrudes outwardly from said pinion gear.

4. An axle assembly as set forth in claim 3, wherein said outboard pinion shaft segment is rotatably supported by said self-lubricating cartridge pinion input bearing and said inboard pinion shaft segment is rotatably supported by a spigot bearing that is mounted to said carrier housing such that said pinion shaft is rotatably supported on opposing sides of said pinion gear.

\* \* \* \* \*